Figure 1:
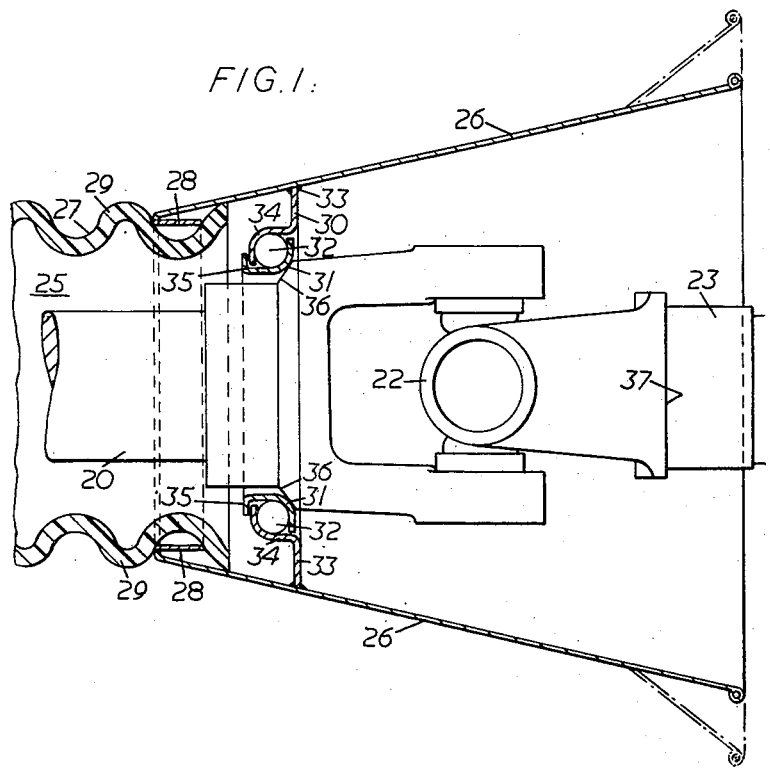

March 28, 1961  R. L. ATKINSON  2,976,703
MACHINERY GUARDS
Filed Sept. 9, 1959  2 Sheets-Sheet 1

Inventor:
RICHARD LESLIE ATKINSON
By
Richardson, Davis and Nordon
Attorneys

March 28, 1961  R. L. ATKINSON  2,976,703
MACHINERY GUARDS

Filed Sept. 9, 1959  2 Sheets-Sheet 2

Inventor:
RICHARD LESLIE ATKINSON
By
Richardson, Davis and Nordon
Attorneys.

2,976,703
Patented Mar. 28, 1961

2,976,703

MACHINERY GUARDS

Richard Leslie Atkinson, Bolton-by-Bowland, near Clitheroe, England, assignor to Atkinson's Agricultural Appliances Limited, Clitheroe, England, a company of Great Britain Filed Sept. 9, 1959, Ser. No. 838,993

4 Claims. (Cl. 64—4)

This invention relates to machinery guards and more especially to safety guards for machinery including a shaft coupling between driving and driven parts providing for variation in the interspacing and other positional relationship of said parts. An example of such machinery is a vehicle-mounted power take-off, an implement trailed by or otherwise hitched at the rear of the vehicle and including mechanism to be driven from the power take-off, and shaft means intercoupling the power take-off and the implement mechanism in driving relationship, said shaft means being of telescopic construction and including at least one universal joint to cater for change in the relative positional relationship of the vehicle and the trailed implement.

The location of the power take-off on tractors below the driving seat has in the past been the cause of accidents due, for example, to clothing hanging below the seat and being caught up in the coupling shaft means at the power take-off end where a universal joint has generally been provided. The object of the present invention is to provide an efficient safety guard with a view to preventing such accidents.

It has been proposed to use for the purpose, a tubular safety guard having a continuous wall adapted floating to encompass the shaft coupling throughout its length and capable both of longitudinal compression and expansion and of axial bending, and formed at each of its ends with an end piece adapted to fit with clearance, over one said universal joint.

In use, such safety guards are intended to fit loosely about the shaft coupling and, as the latter rotates, the guard is intended to rotate freely thereon.

It has however been found that the end pieces of such guards may bind on the universal joints when such a guard is compressed as the shaft shortens during turns of the towing vehicle and trailed implement, and it is an object of the present invention to prevent such binding.

The present invention is, for machinery including a shaft coupling comprising a telescopic shaft provided adjacent each of its ends with a universal joint from which extend stub shafts which mate with driving and driven parts whereby the coupling provides for variation in the interspacing and other positional relationship of said parts, a tubular safety guard including a continuous envelope adapted floatingly to encompass the shaft coupling throughout its length, said envelope being of elastic material at least at its ends, whereby it is capable of longitudinal compression and expansion, two circumferential crests at each end of said envelope defining therebetween an external groove, a frusto-conoidal end piece at each end of said continuous envelope, a ring secured internally to each end piece near its smaller end, and having a diameter intermediate that of the base of said groove and that of either crest defining the groove, said ring being located in said groove and the increasing diameter portions of each end piece extending away from said envelope, each said end piece being of such internal volume that it can fit, with clearance, over one of said universal joints, and a thrust bearing located within each of said end pieces, each said thrust bearing being disposed co-axially with the envelope and with its bearing surface facing the mouth of the end piece wherein it is located, so as to prevent binding of the end pieces on the universal joints when the shaft shortens.

Figure 2:
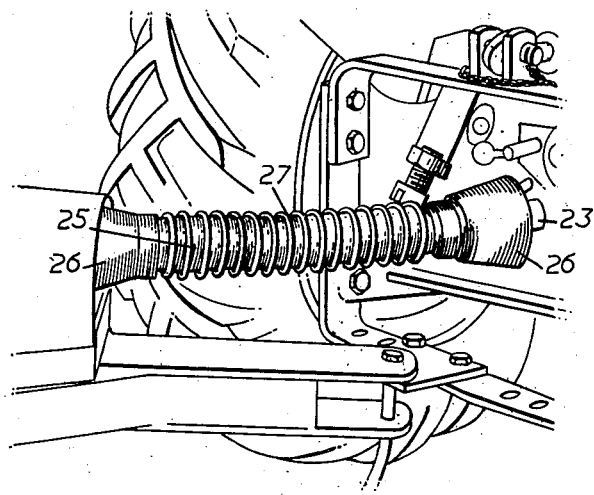

An embodiment of the invention will now be described by way of example, with reference to the accompanying drawings in which:

Fig. 1 is a fragmentary longitudinal section of a safety guard in position over a shaft coupling shown in elevation; and Fig. 2 is a side elevation of the safety guard in a position of use.

The shaft coupling comprises a telescopic shaft 20, provided adjacent each of its ends with a universal joint 22 from which extends a stub shaft 23, one such stub shaft being adapted to mate with a power take-off spigot, for example on a tractor and be fixedly secured therein, and the other stub shaft to mate with a spigot in an implement mechanism, for example on a trailer, and be fixedly secured therein.

This construction is known per se and caters for change in the relative positional relationship of the tractor and the implement, for example when full turns are being made at headlands, in which event both stub shafts are misaligned with the telescopic shaft 20 and the effective length of the latter is subject to variation.

The safety guard comprises a tube 25 of rubber or other elastomeric material which sheaths the telescopic shaft 20 and is designed to expand and contract lengthwise as the telescopic shaft 20 varies in length.

The wall 27 of the rubber tube 25, which may be reinforced, is regularly sinusoidal or undulating in the longitudinal direction, the minimum internal diameter of the tube along its shaft-enveloping length being greater than the maximum outside diameter of the telescopic shaft 20, so that the tube 25 is freely floating on the shaft. The tube 25 is formed at each end with an end piece 26 defining a socket frustro-conoidal shape designed to fit, with clearance, over the universal joint 22 thereat, and is conveniently made of sheet metal. Conveniently, to increase the clearance between the stub shafts 23 and the end pieces 26, without changing the shape of the latter over the major part of their length, the end pieces 26 may be flared at their mouths, as shown in chain dotted lines.

Each frusto-conoidal end piece 26 is provided internally at its lesser diameter end where it is fitted to the tube 25 with a ring 28 which is welded into position, all sharp edges having first been removed therefrom. These rings retain the tube ends in position and no other attachment means of any kind are necessary. In fitting the end pieces 26 to the tube the latter is cut circumferentially along a ridge 29 and the end so formed is squeezed into the lesser diameter end of the end piece and allowed to fall over the inner rim of the ring 28 into the position shown in Fig. 1, where it fits snugly and firmly.

In order positively to prevent binding of the end pieces 26 on the universal joints 22 when the telescopic shafts shorten during turns and the tube 25 is compressed, each end piece is provided internally with a thrust bearing comprising an outer ring 30, 34 an inner ring 31, and ball bearings 32 disposed in the space formed between the two rings. The outer ring 30 is welded at 33 to the inner surface of the end piece 26 at a predetermined distance from and parallel to the ring 28.

The outer ring comprises a flat rim portion 30 disposed normal to the axis of the socket or end piece and a rounded bearing portion 34 offset to the rim portion towards the lesser diameter end of the end piece with the concave surface of the bearing portion 34 facing away from said lesser diameter end. The inner ring comprises a rounded bearing portion 31 disposed with its concave surface facing that of the rounded bearing portion 34 thereby to provide therewith the race for the balls 32, the inner ring being provided with four circumferentially spaced tabs 35, at its edge adjacent the lesser diameter end of the end piece and these tabs are peened over the inner edge of the outer ring to lie against the convex surface of the bearing portion 34 on assembly of the thrust bearing.

In fitting a safety guard according to the present invention over a power take-off shaft between a tractor and an implement, the tractor and the implement are connected and the power take-off shaft is fitted. The distance between the inner ends 37 of the two stub shafts 23 is then measured and there is deducted from such measurement a predetermined length in accordance with the length of the end pieces 26. For example, with end pieces 18 cms. long, the deduction might be 28 cms., the tube being then cut circumferentially along the nearest ridge greater than said predetermined length. The end pieces are then fitted on the ends of the tube as hereinbefore described, making certain that the fit is snug and firm.

The power take-off shaft is then disconnected from the tractor and the male section thereof is with-drawn. The guard is then fitted over the female section of the telescopic power take-off shaft, the male section of the latter is re-fitted and the shaft re-coupled to the tractor power take-off. Care is taken to ensure that the protective housings on the tractor and implement provide adequate cover over the free ends of the end pieces 26.

In cases where a power take-off shaft is to be offset relative to the implement, for example when a potato elevator digger is being trailed by the tractor and derives power from the tractor power take-off, the rubber tube 25 of the guard may be pre-compressed by say 17 cms. or thereabouts to cater for shaft elongation on sharp turns. Also, with shafts requiring tubes longer than say one metre, thus leading to difficulty in joining the ends of the two shaft sections therewithin, it may be advantageous to cut the tube in halves and to connect the adjacent ends of the halves after the shaft sections have been joined, by a metal collar, the ends of which could conveniently be designed similarly to the lesser diameter ends of the end pieces 26, i.e. with tube-retaining means similar to that provided by the ring 28.

In operation, the safety guard according to the invention rotates with the power take-off shaft but stops rotating when a comparatively small braking torque is applied to it, thus preventing any possibility of freely hanging clothing of the operator being wrapped around it.

The safety guard is fitted with the rubber tube slightly compressed and with the tractor and implement in the normal position, i.e. axially aligned. When operation of the tractor-implement combination is such that the shaft lengthens or shortens, the safety guard copes with these movements, the boss 36 of each universal joint continuously maintaining contact with the inner ring 31 of the thrust race in the related end piece 26. The thrust races therefore take the axial load at all times and the knuckles of the universal joints have complete freedom of movement within the end pieces 26.

If desired, an external circumferential rib may be provided on the female section of the telescopic shaft at its portion of maximum external diameter, the diameter of the rib being intermediate the minimum and maximum internal diameters of the undulating length of the tube 25. Such a rib, if provided, is positioned longitudinally at a position on the shaft which is intended to coincide with the depression of the undulating tube 25 adjacent one end thereof, the arrangement being such that, once fitted, said tube 25 will remain in position on the female section of the shaft in the event of uncoupling of the shaft coupling from either of the spigots.

The length of the tube 25 enveloping the telescopic shaft may alternatively be accordion-creased.

It will be manifest that the safety guard of the present invention will completely envelope the shaft coupling while not impairing the working of the latter, and will remain in position throughout a working operation, thus positively preventing such accidents as may occur on exposure of the universal joint of the coupling during operation.

I claim:
1. For machinery including a shaft coupling comprising a telescopic shaft provided adjacent each of its ends with a universal joint from which extend stub shafts which mate with driving and driven parts whereby the coupling provides for variation in the inter-spacing and other positional relationship of said parts, a tubular safety guard including a continuous envelope adapted floatingly to encompass the shaft coupling throughout its length, said envelope being of elastic material at least at its ends, whereby it is capable of longitudinal compression and expansion, two circumferential crests at each end of said envelope defining therebetween an external groove, a frustro-conoidal end piece at each end of said continuous envelope, a ring secured internally to each end piece near its smaller end, and having a diameter intermediate that of the base of said groove and that of either crest defining the groove, said ring being located in said groove and the increasing diameter portions of each end piece extending away from said envelope, each said end piece being of such internal volume that it can fit, with clearance, over one of said universal joints, and a thrust bearing located within each of said end pieces, each said thrust bearings being disposed coaxially with the envelope and with its bearing surface facing the mouth of the end piece wherein it is located, so as to prevent binding of the end pieces on the universal joints when the shaft shortens.

2. A tubular safety guard as set forth in claim 1, wherein the continuous envelope comprises a succession of external crests and troughs and said external grooves are defined by the trough nearest to each end of the continuous envelope.

3. A tubular safety guard as set forth in claim 2, wherein the continuous envelope consists of two like parts joined together longitudinally, and a collar so joining them.

4. The combination of a tubular safety guard as set forth in claim 1, and a shaft coupling encompassed thereby, said shaft coupling including a telescopic shaft, a universal joint at each end of said shaft, and a stub-shaft extending from each of said universal joints for mating with driving and driven parts.

References Cited in the file of this patent

UNITED STATES PATENTS

| 2,772,549 | Harrington | Dec. 7, 1956 |
| 2,785,549 | Harrington | Mar. 19, 1957 |
| 2,911,803 | Weasler | Nov. 10, 1959 |

FOREIGN PATENTS

| 799,402 | Great Britain | Aug. 6, 1958 |